(12) United States Patent
Wai

(10) Patent No.: US 8,024,336 B2
(45) Date of Patent: Sep. 20, 2011

(54) SYSTEM AND METHOD FOR DEVELOPMENT OF SEARCH SUCCESS METRICS

(75) Inventor: Lawrence Wai, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 298 days.

(21) Appl. No.: 12/481,196

(22) Filed: Jun. 9, 2009

(65) Prior Publication Data

US 2010/0312786 A1    Dec. 9, 2010

(51) Int. Cl.
*G06F 17/30* (2006.01)
(52) U.S. Cl. .......................... 707/731; 707/722; 706/15
(58) Field of Classification Search .................... None
See application file for complete search history.

(56) References Cited

U.S. PATENT DOCUMENTS

| | | | | |
|---|---|---|---|---|
| 7,024,033 | B2* | 4/2006 | Li et al. | 382/159 |
| 7,895,198 | B2* | 2/2011 | Chapelle | 707/728 |
| 2006/0276985 | A1* | 12/2006 | Xu et al. | 702/81 |
| 2009/0024607 | A1* | 1/2009 | Sun et al. | 707/5 |
| 2009/0037402 | A1* | 2/2009 | Jones et al. | 707/5 |
| 2009/0248667 | A1* | 10/2009 | Zheng et al. | 707/5 |

* cited by examiner

*Primary Examiner* — Apu Mofiz
*Assistant Examiner* — Hung Le
(74) *Attorney, Agent, or Firm* — James J. DeCarlo; Greenberg Traurig, LLP

(57) ABSTRACT

A system and method for development of search success metrics. A plurality of search engine result pages are collected and a target page success metric is determined for each page. A plurality of machine learned page success metrics are trained using a first subset of the search engine result pages and each result page's respective target page success metric, wherein each of the machine learned page success metrics is trained to predict the target page success metric for each of the first subset of search engine result pages. A predicted target page success metric is predicted for each of a second subset of the search engine result pages using each of the machine learned page success metrics. The accuracy of each of the machine learned page success metrics in predicting the target page success metric associated with each of the second subset of search engine result pages is then evaluated.

30 Claims, 7 Drawing Sheets

SYSTEM AND METHOD FOR DEVELOPMENT OF SEARCH SUCCESS METRICS

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for evaluating the success of search product results and, more particularly, to systems and methods for evaluating the effectiveness of metrics used to evaluate the success of search product results

BACKGROUND OF THE INVENTION

As new techniques for search result optimization are developed and fine-tuned, methods for evaluating the effectiveness of search results must be developed as well to guide the process of search optimization and aid in fine tuning optimization schemes. Various metrics can be used to evaluate the success of a search product. Unfortunately, gathering data for computing search metrics can be time-consuming and expensive, and it may be difficult to determine which metrics are best suited for evaluating the success of search product results.

SUMMARY OF THE INVENTION

In one embodiment, the invention is a method. A plurality of search engine result pages are collected over a network. A target page success metric is determined, using at least one computing device, for each of the search engine result pages. Using the computing device, a plurality of machine learned page success metrics are then trained using a first subset of the search engine result pages and each result page's respective target page success metric, wherein each of the machine learned page success metrics is trained to predict the target page success metric for each of the first subset of search engine result pages. Using the computing device, a predicted target page success metric is predicted for each of a second subset of the search engine result pages using each of the plurality of machine learned page success metrics. The accuracy of each of the plurality of machine learned page success metrics in predicting the target page success metric associated with each of the second subset of search engine result pages is evaluated using the computing device. A representation of the accuracy of the of each of the plurality of machine learned page success metrics is then output to a display medium using the computing device.

In one embodiment, the invention is a system comprising a set of modules, each module comprising one or more processors programmed to execute software code retrieved from a computer readable storage medium storing software for performing one or more functions. The modules include: a search engine result pages collection module for collecting, over a network, a plurality of search engine result pages; a target page success metrics determination module for determining a target page success metric for each of the plurality of search engine result pages; a machine learned page success metrics training module for training a plurality of machine learned page success metrics using a first subset of the plurality of search engine result pages and each result page's respective target page success metric, wherein each of the machine learned page success metrics is trained to predict the target page success metric for each of the first subset of the plurality of search engine result pages; a target page success prediction module for predicting, using each of the plurality of machine learned page success metrics, a predicted target page success metric for each of a second subset of the search engine result pages; and a page success metrics evaluation module for evaluating the accuracy of each of the plurality of machine learned page success metrics in predicting the target page success metric associated with each of the second subset of search engine result pages.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
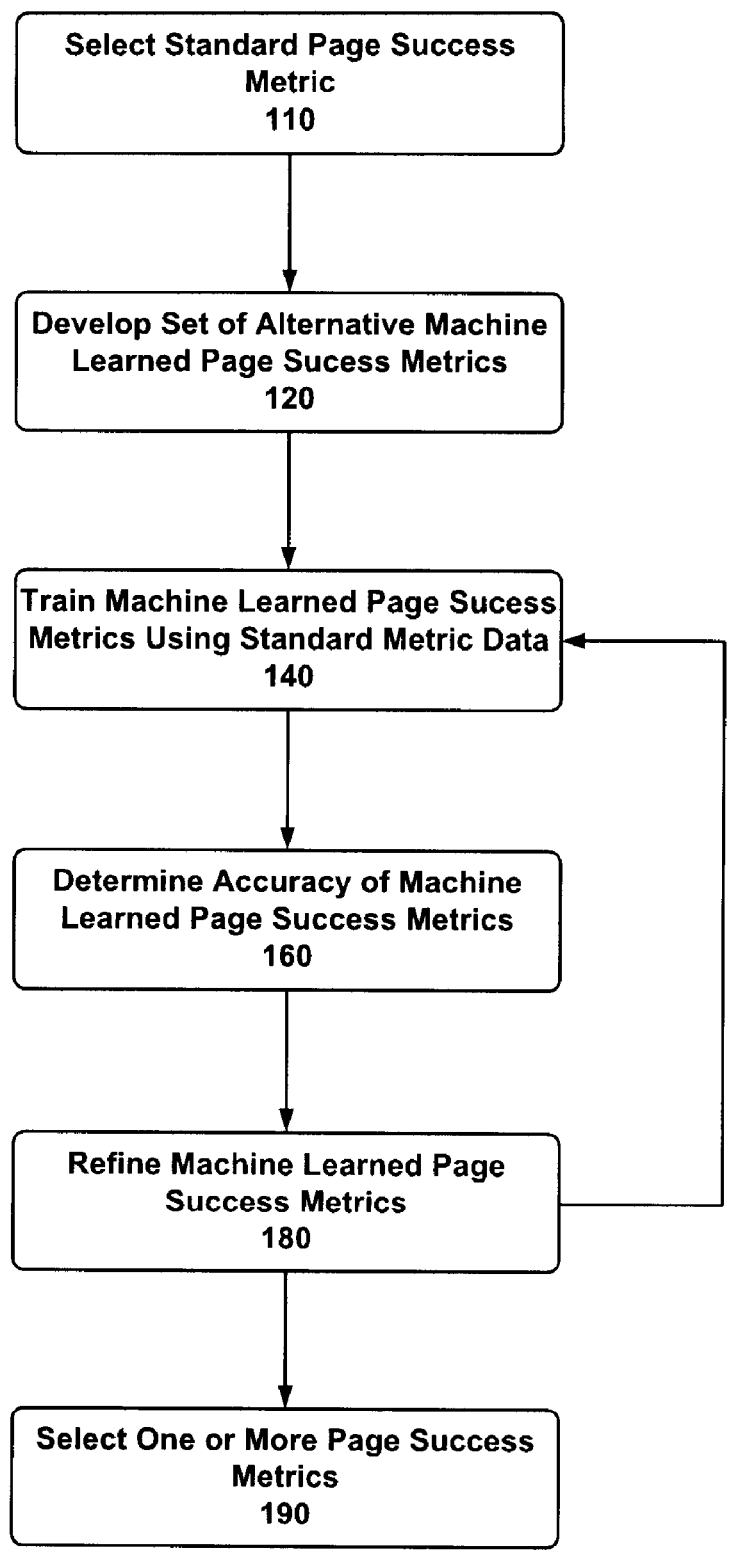
FIG. 1 illustrates one embodiment of a basic framework for the development of search success metrics.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing and/or database and/or communication facilities. By way of example, and not limitation, the term "server" can refer to a single, physical processor with associated communications and/or data storage and/or database facilities, or it can refer to a networked or clustered complex of processors and/or associated network and storage devices, as well as operating software and/or one or more database systems and/or applications software which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

In one embodiment, the present invention is directed to a system and method that provides means for systematically developing, validating, and optimizing a broad range of user experience metrics for search products, including but not limited to presentation, ranking, diversity, query reformulation, SRP enhancements, and advertising.

FIG. 1 illustrates one embodiment of a basic framework for the development of search success metrics.

First, a standard page success metric is selected 110. The standard page success metric represents a page success metric that is considered highly reliable, but which may be too costly or time consuming to measure on an ongoing basis. Such metrics may be costly or time consuming because, for example, they involve collection of large amounts of data, because they require extensive human editing or verification, or are computationally intensive.

Next, a set of one or more alternative machine learned page success metrics 120 are developed which attempt to predict the standard metric using, in one embodiment, data that is less costly or time consuming to obtain. Such machine learned page success metrics are trained using the standard metric data 140. The accuracy of the trained machine learned page success metrics is then determined 160. The machine learned page success metrics can be refined 180 and retrained, if desired. Finally, one or more page success metrics can be selected for use 190.

Figure 2:
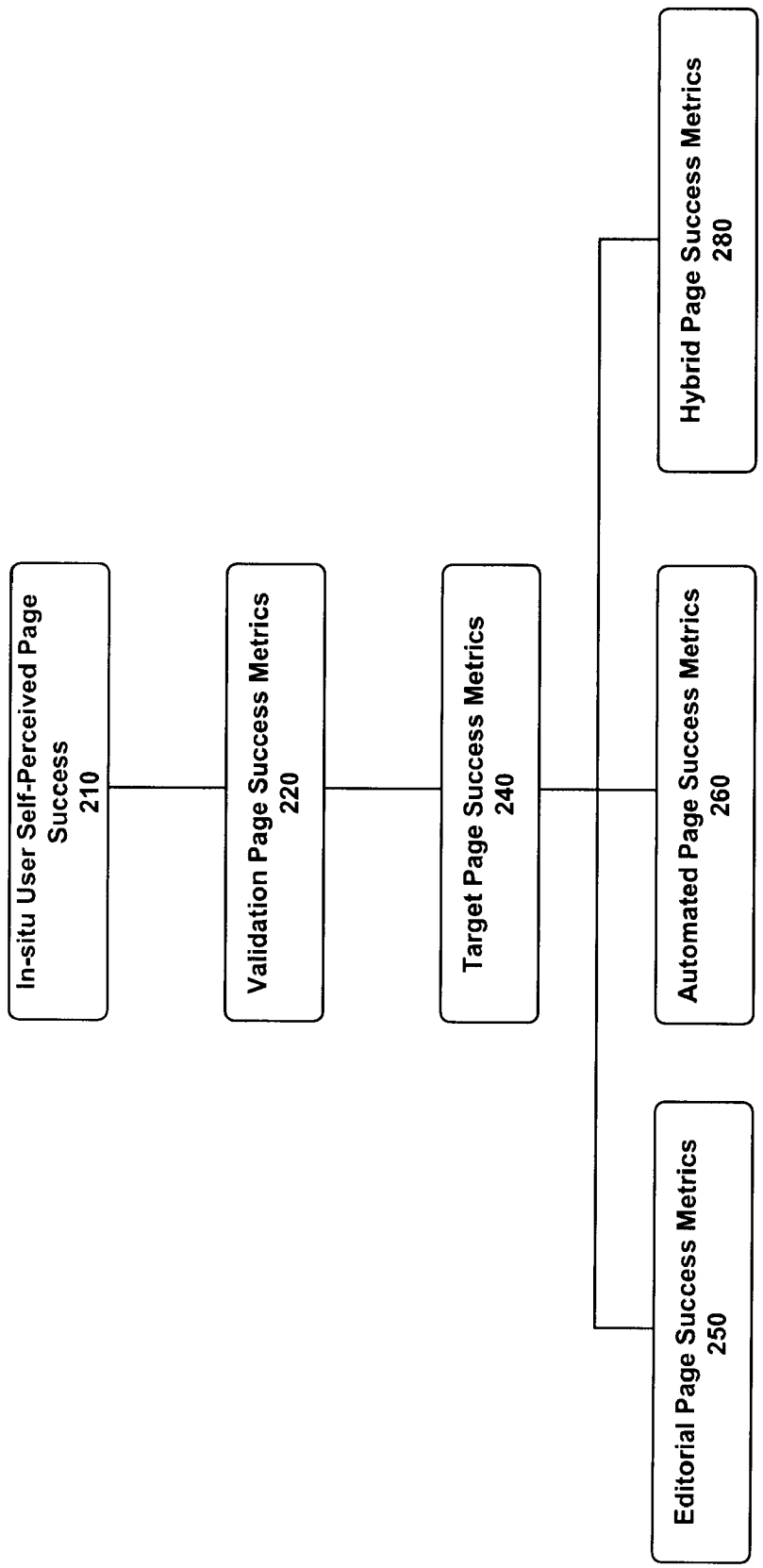
FIG. 2 illustrates a high-level diagram of one embodiment of major classes within a family of page success metrics.

This methodology can be used, without limitations, to solve the following problems:
how to evaluate the presentation effectiveness of result summaries
how to evaluate the value of diversity
how to evaluate the value of ranking in the context of actual user experience
how to evaluate SRP enhancements
how to evaluate query reformulation
how to evaluate the whole page search experience, including ads In one embodiment, the system and method uses individual search engine result pages as experienced by users as the basic unit for metrics development. Such data can be used to develop one or more of a family of metrics. This family of metrics can be generally referred to as "page success metrics". FIG. 2 illustrates a high-level diagram of one embodiment of major classes within a family of page success metrics 200. In the diagram, the classes are ranked by their presumed reliability for evaluating the success of search results. It is also generally true that the higher a class is ranked, the greater the cost of obtaining the metric.

At the top of the hierarchy is the essentially unobtainable ideal of a user's in-situ, perception of a search results page's success 210. Such a hypothetical metric could only be obtained via some manner of directly evaluating the user's perceptions of the search page results. No such techniques are currently known in the art.

Next in the hierarchy of metrics are validation page success metrics 220. Two examples of validation metrics include editorial session analysis, or user self-reported success. Each method has its advantages and pitfalls. For editorial session analysis, we have the advantage of unbiased sampling of natural sessions, however the evaluation of success must be inferred. For user self-reported success, we have the advantage of obtaining a direct evaluation of success by the user, however the session sampling is biased by the nature of the self-reporting process itself.

Validation page success metrics are the closest to the ultimate goal of in-situ user self-perceived success. These metrics are the "gold standard" for in-situ user self-perceived page success; however, these measurements are also generally the most costly and time consuming to obtain.

Next in the hierarchy of metrics are target page success metrics 1400. Target page success metrics can utilize a combination of automated metrics along with editorial input (which can be streamlined for the sake of efficiency) to identify the success of a search in identifying target pages of interest. While such metrics may not be as "high fidelity" as validation page success metrics, they are, nevertheless relatively accurate, and serve as a "silver standard" for in-situ user self-perceived page success.

Such metrics can be computed, for example, using query logs of a commercial web query search service. Such metrics can, in one embodiment, utilize the click-through-rate (CTR) on search result pages as a measure of success For example, a target page success metric, S, can be defined as:
S=1 if the user clicks on at least one relevant result
S=0 otherwise Such metrics can be supplemented by editorial judgments, such as, for example, whether the query is a navigational query (i.e. the user had one search result in mind) or non-navigational. Such results could also be supplemented by editorial judgments as to whether the relevance of a first displayed search result is better than the second displayed search result.

For example, such a metric was used to evaluate query success in a sample of 1,000 page views from the Yahoo! corporation's query logs for different query classes and result ranking configurations. The results were evaluated for navigational queries and non-navigational queries. The results were also evaluated for cases where the relevance of the result at rank 1 (wd1) is better or worse than the relevance of the result at rank 2 (wd2).

TABLE 1

CTR versus Search Success

| Query Class | wd1-wd2 | Fraction of All | CTR Rank 1 | CTR Rank 2 | Search Success |
|---|---|---|---|---|---|
| non-nav | >=0 | 60% | 33% | 12% | 25% |
| non-nav | <0 | 9% | 28% | 18% | 18% |
| Nav | >=0 | 65% | 8% | 68% | 68% |
| Nav | <0 | 36% | 18% | 36% | 36% |

Such search success metrics can be used as an evaluation metric for both result presentation, as well as result ranking. As the result presentation improves, the rate of search success increases; similarly, as more relevant results are ranked higher on the search engine result page, the rate of search success increases.

It should be noted that improvements in result summaries can actually reduce CTR at rank one (i.e. the first result returned in the search result page) for those search engine result page's where the result at rank one is not relevant to the query, in part, because the user is better able to discern the low quality of the result. On the other hand, as the user scans lower on the page, he/she is also better able to discern the quality of relevant results, and therefore, the overall rate of search success increases.

Other examples of target page success metrics may include more complex blends of editorial and session variables. Such metrics may include including "dwell times", which are the differences in timestamps between actions on a search engine result page.

Target page success metrics can be used to generate relatively low cost training datasets for machine learned metrics. Thus, in many cases, reasonably high statistics can be obtained for the purpose of machine learned metric training. The relatively low cost of these metrics also facilitates their use as an evaluation metric for various search engine result page key characteristics.

Next in the hierarchy of metrics are editorial page success metrics 250. Editorial page success metrics are, in one embodiment, a form of machine learned ranking optimization metric. Input to editorial page success metric is a limited set of observations relating to search result success produced by a human editor. The data can be used to empirically compute a search result page success metric. While such a metric is superficially comparable to a user self-reported success or editorial session analysis metric, an editorial page success metric can use, in one embodiment, a smaller number of editorial observations relating to a search result page to reach a conclusion regarding the success of a search result page.

One example of a editorial page success metric 250 is a discounted cumulative gain (DCG) metric which can be used, in one embodiment, to evaluate the success of a non-navigational query. DCG for a set of results r can be defined as follows:

$DCG = \Sigma r\ w_r\ wd_r$ $w_r = 1/\log_2(rank+1)$, rank=rank of result $wd_r$=relevance weight for result at rank r, i.e. wd(perfect)=10, wd(excellent)=7, wd(good)=3, wd(fair)=0.5, wd(bad)=0

In one embodiment, navigational queries can be evaluated using a "best" discounted cumulative gain (BDCG) metric where and BDCG is the "best" term in DCG defined as follows:

$BDCG = \max\{w_r\ wd_r\}$

A machine learned generalization of DCG, which we will can be called "general DCG", or GDCG can be defined for a set of search result pages {k}

$w_r$=rank weight for result at rank r $wd_r$=relevance weight for result at rank r the generalized cumulative gain metric (GDCG) is a function of $w_r$ and $wd_r$ wherein the values of wr and wdr are varied such that the function $\Lambda$ is minimized, where $\Lambda = \Sigma k\ (GDCG_k - S_k)2$ and where k is the kth page view and S is the target page success metric.

Additional parameters can be introduced to account for the presence of north ads, and additional propensity to click on navigational results.

Complementary to the editorial page success metrics are automated page success metrics 260. Such metrics can be used for automated evaluation of search result page success which can be useful when editorial resources are a constraining factor. For example, an example, dwell times for clicks on web results as features for an automated page success metric:

WebDtr=time (seconds) after the click on web result at rank r before the next user action (click or search)

WebDt=0 if there is no click on the result

Figure 3:
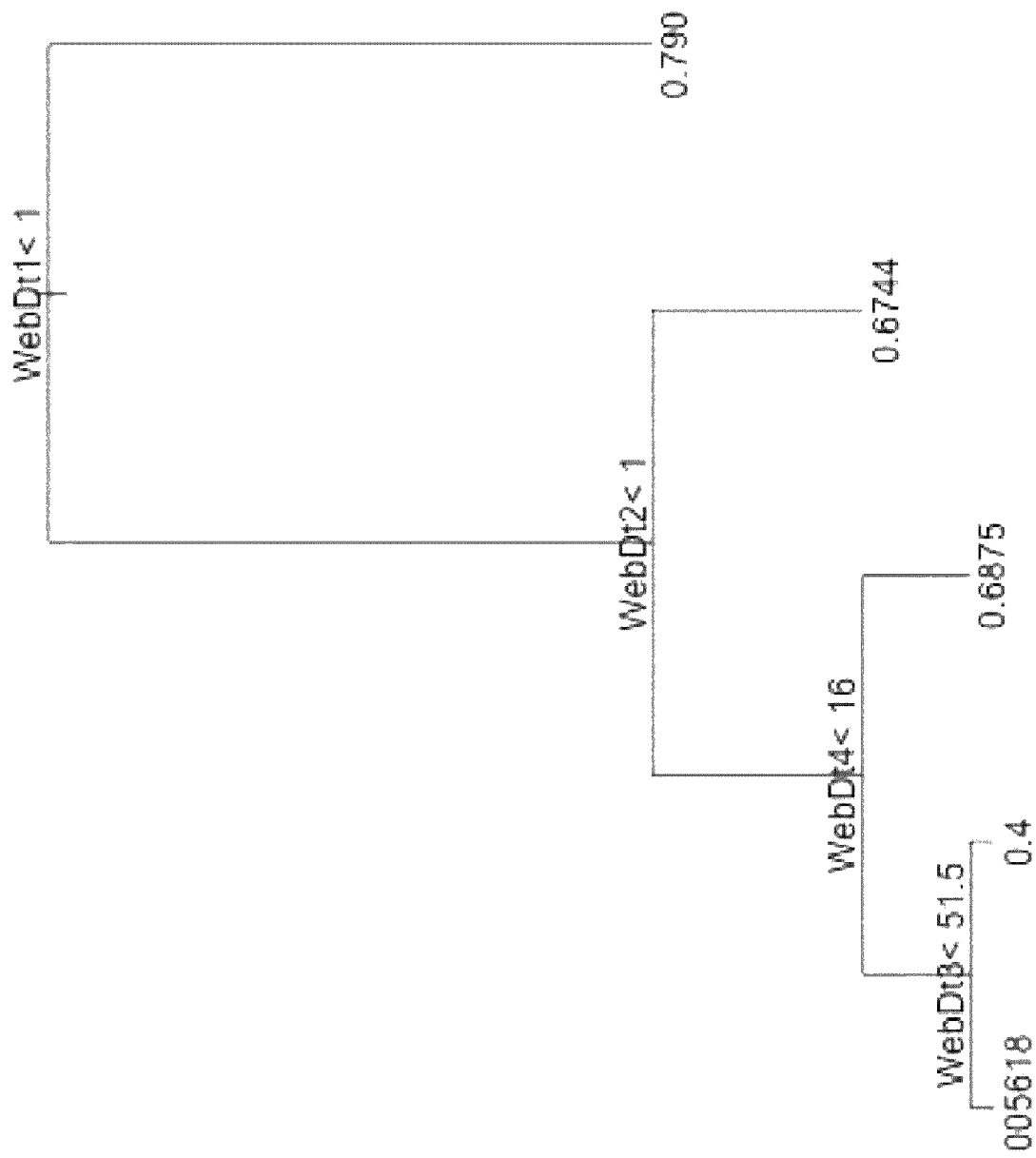
FIG. 3 illustrates the results of one embodiment of a decision tree regression performed using a target page success metric as a target.

In one experiment, a decision tree regression was performed using a target page success metric as a target. The resulting decision tree is shown in FIG. 3.

Referring back to FIG. 2, 280, another group of page success metrics are hybrid page success metrics. In one embodiment, hybrid page success metrics combine editorial and automated page success metrics, for example, by applying editorial page success data to data gathered by an automated process. For example, data relating to dwell times could be enhanced by editorial data, e.g. navigational vs. non-navigational.

Figure 4:
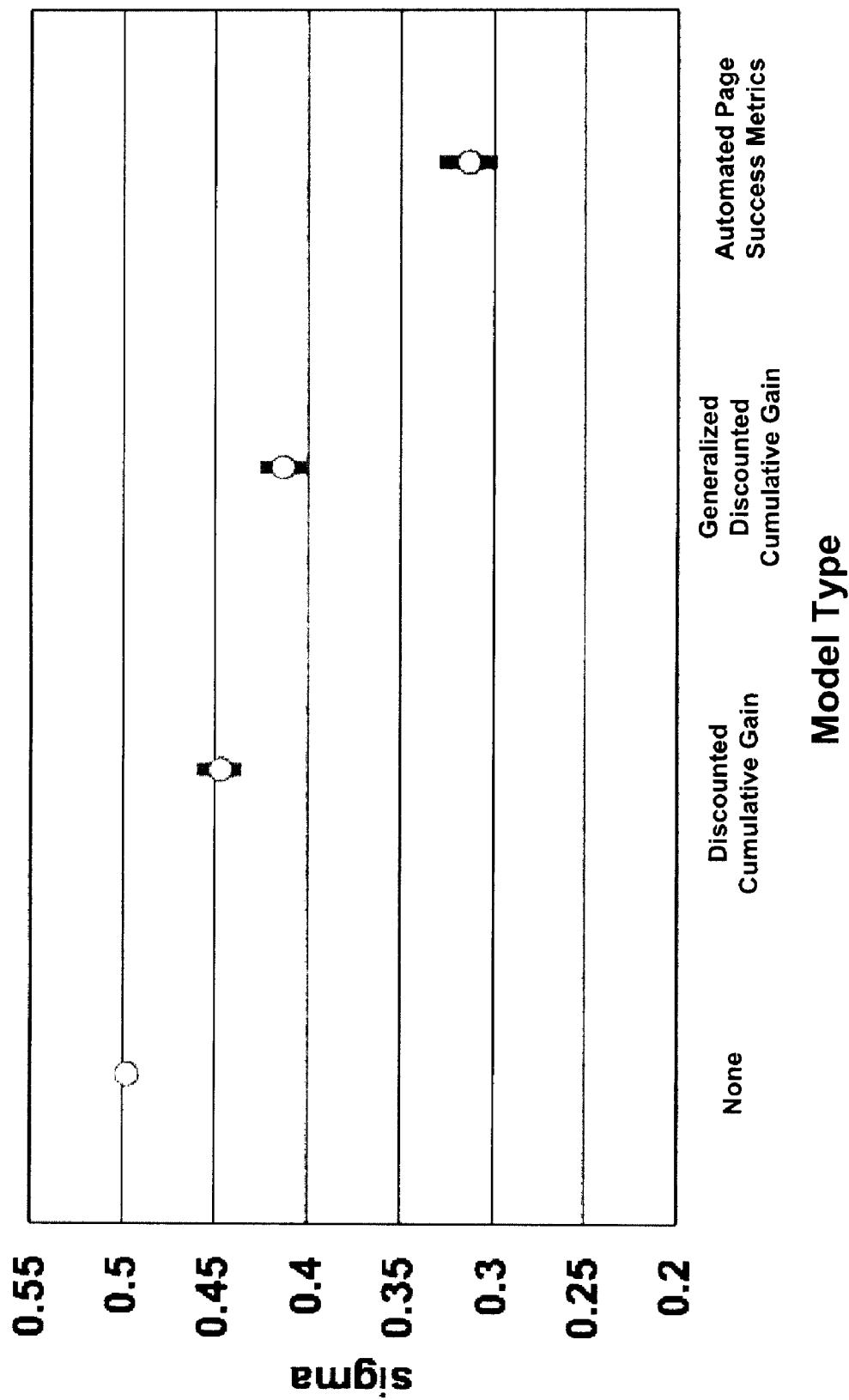
FIG. 4 illustrates the results of one embodiment of a sigma for set of page success metrics.

Machine leaned success metric such as, but not limited to, those shown in 250, 260 and 280 can be trained using target page success metrics 240, then the machine learned metrics can be evaluated for their success in predicting the target metrics. In one embodiment, the accuracy of a metric can be evaluated using an error parameter, sigma, wherein:

$sigma = \sqrt{\Lambda N}$ $\Lambda = \Sigma k\ (PSMk - Sk)2$ where N is the number of pageviews k is the kth page view and S is the target page For example, in one experiment, an independent 1,000 page views were used from the Yahoo! corporation's query logs (not the ones used for training.) In order to estimate the confidence range for sigma, 1,000 bootstrap experiments were performed with resampling from the 1,000 page views. The results are shown in FIG. 4. The "none" case is obtained by using the mean value of S as a constant "model". The results indicate that discounted cumulative gain is significantly better than the "none" case, which means that it makes a meaningful improvement to prediction of the target page success metric. It is also seen that the generalized (parameterized) discounted cumulative gain is significantly better than an unparameterized discounted cumulative gain at predicting the target page success metric. Finally, it is also seen that that the automated page success gives an even better prediction of the target page success metric.

The experiment discussed above is purely exemplary, and is not intended to be limiting. Any type or number of page success metrics could be evaluated for their relative effectiveness in accurately predicting target page success metrics, and the results obtained could vary from those presented in FIG. 4. Furthermore, such an evaluation process could be repeated any number of times whenever new success metrics are developed, or for ongoing monitoring of the effectiveness of existing page success metrics.

Figure 5:
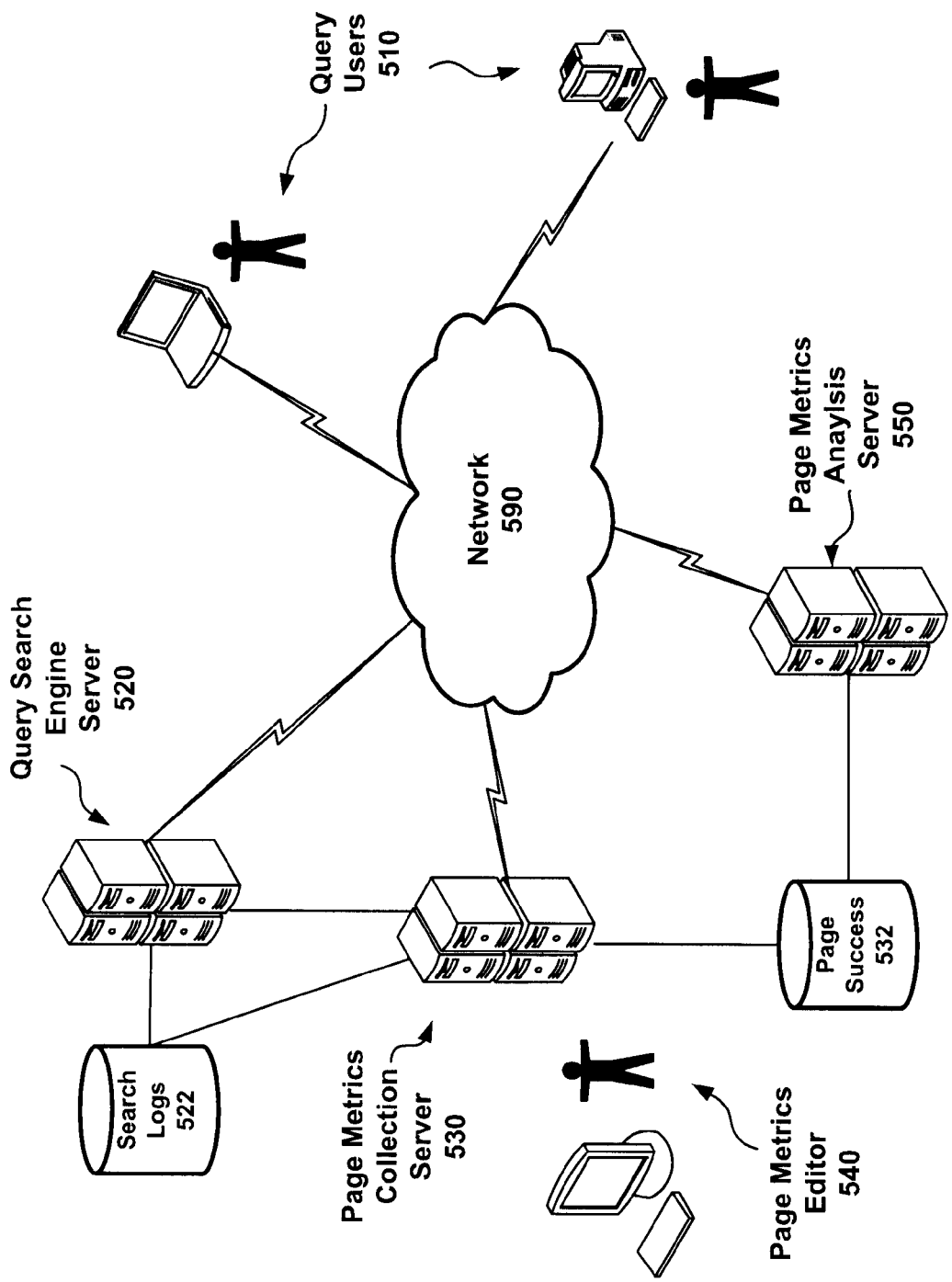
FIG. 5 illustrates one embodiment of a system that could be used to support at least one embodiment of the present invention.

FIG. 5 illustrates one embodiment of a system that could be used to support at least one embodiment of the present invention.

A plurality of users 510 utilize a conventional web query service, such as that offered by Yahoo! or Google, over a network such as, for example, the Internet. The query service is hosted on one or more query search engine servers 520. The query service collects data relating to web queries, including, without limitation. the input queries, query results and click through data on search results. The data relating to web queries is stored on one or more query search logs 522. One or more page metrics collection servers 530 access query logs, either directly or through services provided by the query search engine servers 520, to collect search result page data from the query logs.

Such search result page data can be automatically analyzed by the page metrics collection servers 530 to create page success metrics stored on one or more page success metrics databases 532. The page success metrics may be subject to editorial revision by one or more page metrics editors 540 to create, for example, validation page success metrics, target page success metrics, and/or editorial page success metrics such as described above. The resulting target page success metrics 532 can then be used by the page analysis servers 550 to train a plurality of machine learned page success metrics hosted on the page analysis servers. The target page success metrics 532 can then be further utilized by the page analysis servers 550 to evaluate the success of the machine learned page success metrics.

The hardware configuration illustrated in FIG. 5 is intended to be exemplary, not limiting, and it is understood that any of the servers shown could represent multiple servers distributed over multiple locations, or alternatively, could represent a single server or cluster of servers implementing all of the functions described.

Figure 6:
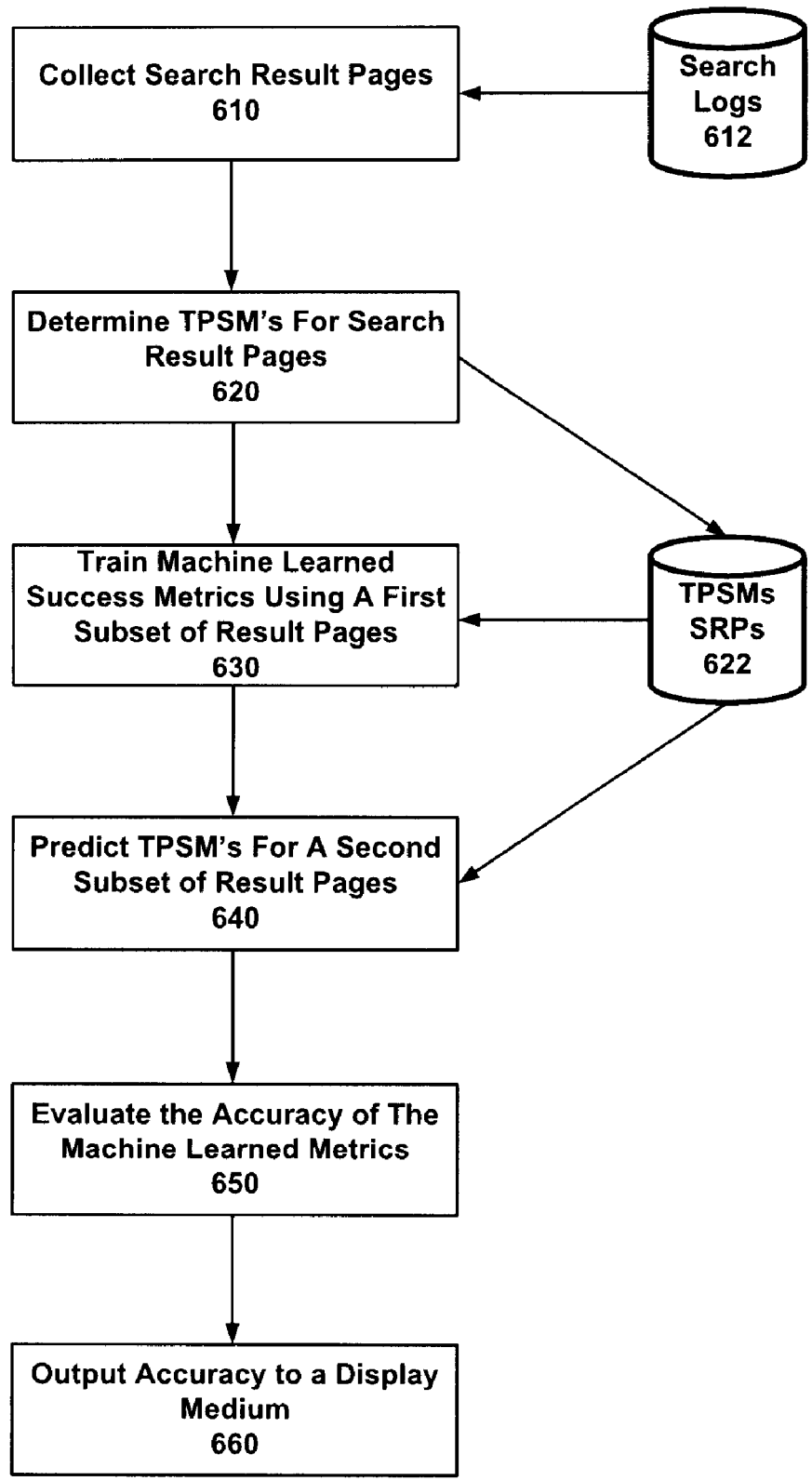
FIG. 6 illustrates one embodiment of a computer implemented process implementing at least one embodiment of the present invention.

FIG. 6 illustrates one embodiment of a computer implemented process implementing at least one embodiment of the present invention.

A plurality of a plurality of search engine result pages are collected 610 over a network. In one embodiment, the search engine result pages are page views collected from the query search logs 612 from a conventional web search service such as those provided by the Yahoo! web query service or the Google web query service. In one embodiment, search engine result pages can be associated with at least one session variable. Session variables can include a click through rate on a given search result page and/or a dwell time representing a difference in timestamps between actions on a given search result page. In one embodiment search engine result pages can be associated with at least one editorial variable representing an editorial judgment by a human editor on the relevance of the results of search result pages. In other embodiments, search engine result pages can be associated with combinations of session and editorial variables.

A target page success metric is then determined 620 for each of the plurality of search engine result pages using at least one computing device. In one embodiment, the target page success metric is determined using one or more sessions variables associated with each of the search engine result pages. In one embodiment, session variables include click through rate. For example, a target success metric for each of the search result page can be calculated such that the metric=1 as 1 if a user clicked on at least one result on the respective search result page, and 0 if otherwise. Session variables used in calculating target page success metrics can also include dwell times representing a difference in timestamps between actions on search result pages. Target page success metrics can also be calculated using editorial session variables or a combination of editorial and session variables. Target page success metrics can be stored, along with associated search result pages, on a database or other computer readable medium accessible to the computing device 622.

A plurality of machine learned page success metrics are then trained 630, using at least one computing device, using a first subset of the plurality of search engine result pages and each result page's respective target page success metric. Each of the machine learned page success metrics is trained to predict the target page success metric for each of the first subset of search engine result pages. Such machine learned page success metrics can include editorial page success metrics, such as cumulative gain or discounted cumulative gain, automated page success metrics, such as a decision tree regression based on query search engine results page timestamps, or a hybrid page success metric incorporating elements of editorial and automated page success metrics.

Predicted target page success metrics are then predicted 640 using the computing device using each of the plurality of machine learned page success metrics, for each of a second subset of the search engine result pages. The accuracy of each of the plurality of plurality of machine learned page success metrics in predicting the target page success metric associated with each of the second subset of search engine result pages is then evaluated 650 using at least one computing device.

In one embodiment, the accuracy of each of the plurality of plurality of machine learned page success metrics is determined by calculating an error parameter, sigma, where sigma is defined as sqrt($\Lambda$N), where $\Lambda=\Sigma k$ (PSMk–Sk)2, where N is the number of page views in the second subset of search engine result pages, k is the kth page view in the second subset of search engine result pages, and S is the target page success metric associated with the kth page view of the in the second subset of search engine result pages.

The first subset and the second subset of search result pages and their respective target page success metrics may be selected to refer to classes or subclasses of queries. For example, the first subset of search result pages and the second subset of search result pages can be selected such that each page within each subset is a result page produced in response to a navigational query or a non-navigational query.

A representation of the accuracy of the of each of the plurality of machine learned page success metrics can then be output to a display medium 660. The representations may take any form suitable for displaying quantitative and/or qualitative results. For example, such a representation could be a graph such as that shown in FIG. 4, or could be a table of numbers or ranks. The display medium may be any medium suitable for displaying the representations, such as, for example, a monitor attached to a computing device or hardcopy printouts.

Figure 7:
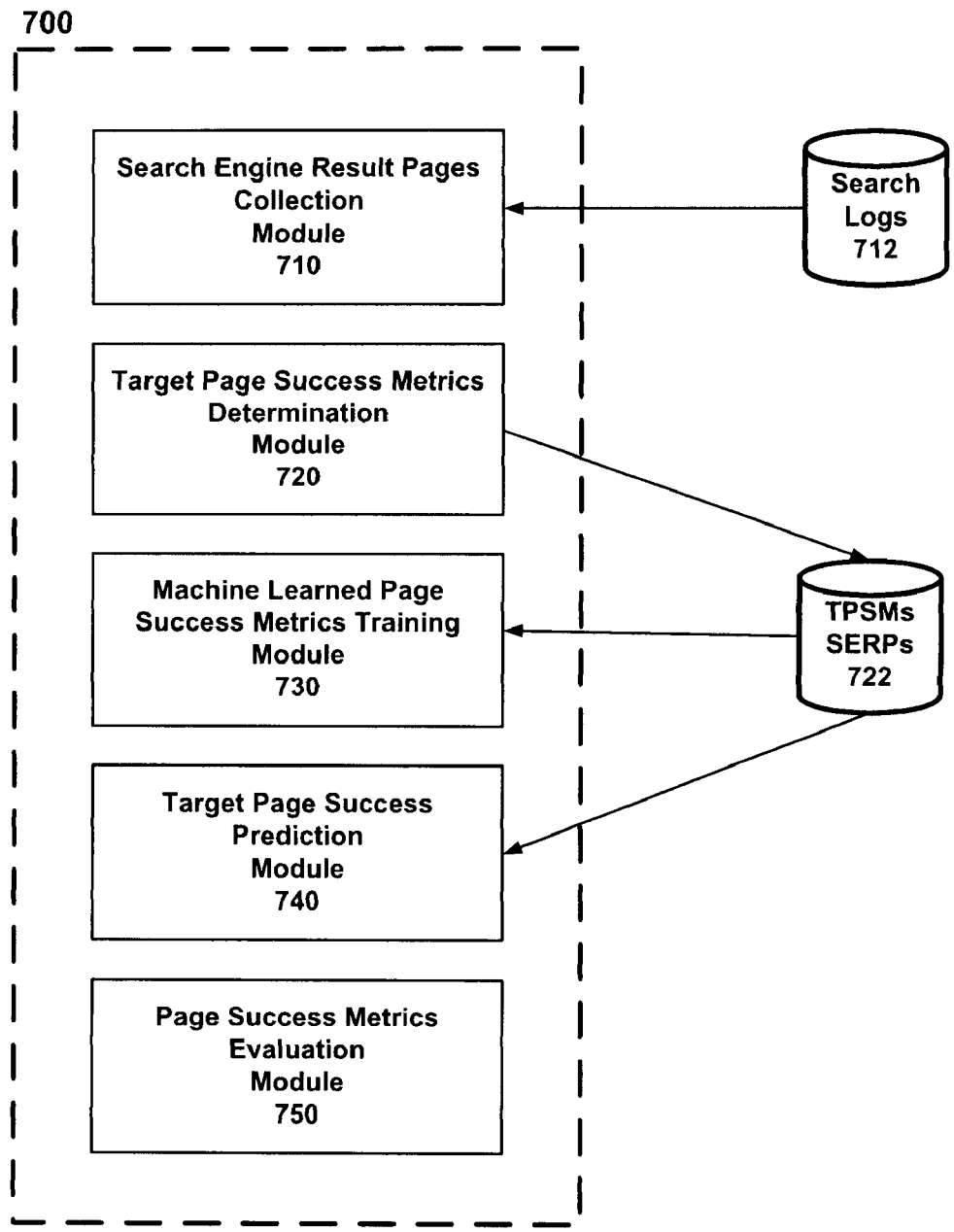
FIG. 7 illustrates one embodiment of a system capable of supporting at least one embodiment of the process shown in FIG. 6.

FIG. 7 illustrates one embodiment of a system capable of supporting at least one embodiment of the process shown in FIG. 6 which can be implemented one or more computing devices. The system comprises a search engine result pages collection module 710, a target page success metrics determination module 720, a machine learned page success metrics training module 730, a target page success prediction module 740 and page success metrics evaluation module 750.

In one embodiment, each of the modules comprises one or more processors programmed to execute software code retrieved from a computer readable storage medium storing software for functions as described below. In one embodiment, each of the modules could be implemented on servers such as servers 530 and 550 shown in FIG. 5. For example, one such configuration could place the search engine result pages collection module 710 and the target page success metrics determination module 720 on the page metrics collection server and the remainder of the modules on the page metrics analysis server 550. Such an embodiment is purely exemplary, and all of the modules shown could be implemented in any combination on any number servers, as will be readily apparent to those skilled in the art.

The search engine result pages collection module 710 is configured to collect, over a network, a plurality of search result pages from one or more sources. In one embodiment, the search engine result pages are page views collected from the search logs 712 from a conventional web search service such as those provided by the Yahoo! web query service or the Google web query service. In one embodiment, search engine result pages can be associated with at least one session variable. Session variables can include a click through rate on a given search result page and/or a dwell time representing a difference in timestamps between actions on a given search result page. In one embodiment search engine result pages can be associated with at least one editorial variable representing an editorial judgment by a human editor on the relevance of the results of search result pages. In other embodiments, search engine result pages can be associated with combinations of session and editorial variables.

The target page success metrics determination module 720 is configured to determine a target page success metric for each of the plurality of search engine result pages collected by the search engine result pages collection module 710. In one embodiment, the target page success metric is determined using one or more session variables associated with each of the search engine result pages. In one embodiment, session variables include click through rate. For example, a target success metric for each of the search result page can be calculated such that the metric=1 as 1 if a user clicked on at least one result on the respective search result page, and 0 if otherwise.

Session variables used in calculating target page success metrics can also include dwell times representing a difference in timestamps between actions on search result pages. Target page success metrics can also be calculated using editorial session variables or a combination of editorial and session variables. Target page success metrics can be stored, along with associated search result pages, on a database or other computer readable medium accessible to the target page success metrics determination module 720.

The machine learned page success metrics training module 730 is configured to train plurality of machine learned page success metrics using a first subset of the plurality of search engine result pages and each result page's respective target page success metric. Each of the machine learned page success metrics is trained to predict the target page success metric for each of the first subset of search engine result pages. Such machine learned page success metrics can include editorial page success metrics, such as cumulative gain or discounted cumulative gain, automated page success metrics, such as a decision tree regression based on query search engine results page timestamps, or a hybrid page success metric incorporating elements of editorial and automated page success metrics.

The target page success prediction module 740 is configured to predict target page success metrics using each of the plurality of machine learned page success metrics for each of a second subset of the search engine result pages collected by the search engine result pages collection module 710. Note that each of the plurality of machine learned page success metrics can be a component of the machine learned page success metrics training module 730, target page success prediction module 740, or alternatively, one or more machine learned page metrics may be implemented by a separate module (not shown) that is implemented independently of the machine learned page success metrics training module or the target page success prediction module 740.

The page success metrics evaluation module 750 is configured to evaluate the accuracy of each of the plurality of plurality of machine learned page success metrics in predicting the target page success metric associated with each of the second subset of search engine result pages processed by the target page success prediction module.

In one embodiment, the accuracy of each of the plurality of plurality of machine learned page success metrics is determined by calculating an error parameter, sigma, where sigma is defined as sqrt($\Lambda$N), where $\Lambda = \Sigma k$ (PSMk−Sk)2, where N is the number of page views in the second subset of search engine result pages, k is the kth page view in the second subset of search engine result pages, and S is the target page success metric associated with the kth page view of the in the second subset of search engine result The page success metrics evaluation module 750 can be further configured to output a representation of the accuracy of the of each of the plurality of machine learned page success metrics to a display medium. The representations may take any form suitable for displaying quantitative and/or qualitative results. For example, such a representation could be a graph such as that shown in FIG. 4, or could be a table of numbers or ranks. The display medium may be any medium suitable for displaying the representations, such as, for example, a monitor attached to a computing device or hard-copy printouts.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising the steps of:
   collecting, over a network, a plurality of search engine result pages;
   determining, using at least one computing device, a target page success metric for each of the plurality of search engine result pages;
   training, using the at least one computing device, a plurality of machine learned page success metrics using a first subset of the plurality of search engine result pages and each result page's respective target page success metric, wherein each of the machine learned page success metrics is trained to predict the target page success metric for each of the first subset of the plurality of search engine result pages;
   predicting, using the at least one computing device, using each of the plurality of machine learned page success metrics, a predicted target page success metric for each of a second subset of the search engine result pages;
   evaluating, using the at least one computing device, the accuracy of each of the plurality of machine learned page success metrics in predicting the target page success metric associated with each of the second subset of search engine result pages; and
   outputting, using the at least one computing device, a representation of the accuracy of the of each of the plurality of machine learned page success metrics to a display medium.

2. The method of claim 1 wherein each of the search engine result pages is associated with at least one session variable and the target page success metric for each of the search engine result pages is determined using the at least one session variable associated with the respective result page.

3. The method of claim 2 wherein the at least one session variable is a click through rate.

4. The method of claim 3 wherein the target success metric for each of the search result pages is expressed as 1 if a user clicked on at least one result on the respective search result page, and 0 if otherwise.

5. The method of claim 2 wherein the at least one session variable is a dwell time, wherein the dwell time represents a difference in timestamps between actions on each search result page.

6. The method of claim 1 wherein each of the search engine result pages is associated with at least one editorial variable and the target page success metric for each of the search engine result pages is determined using the at least editorial session variable associated with the respective result page.

7. The method of claim 1 wherein each of the search engine result pages is associated with at least one session variable and at least one editorial variable and the target page success metric for each of the search engine result pages is determined using the at least one session variable and at least one editorial variable associated with the respective result page.

8. The method of claim 1 wherein the first subset of search result pages and the second subset of search result pages are selected such that each page within each subset is a result page produced in response to a navigational query.

9. The method of claim 1 wherein the first subset of search result pages and the second subset of search result pages are selected such that each page within each subset is a result page produced in response to a non-navigational query.

10. The method of claim 1 wherein at least one of the plurality machine learned page success metrics is an editorial page success metric.

11. The method of claim 10 wherein the editorial page success metric is a discounted cumulative gain metric defined as follows:
   discounted cumulative gain $= \Sigma r\, w_r\, wd_r$
   where $\Sigma r$ is a set of search result pages r
   $w_r = 1/\log 2(\text{rank}+1)$, rank=rank of result
   $wd_r$=relevance weight for result at rank r.

12. The method of claim 11 wherein the relevance weight for result at rank r are defined as follow:
   wd(perfect)=10, wd(excellent)=7, wd(good)=3, wd(fair)=0.5, wd(bad)=0.

13. The method of claim 10 wherein the editorial page success metric is a best discounted cumulative gain metric defined as follows
   best discounted cumulative gain $= \max\{w_r\, wd_r\}$.

14. The method of claim 13 wherein the automated page success metric is a decision tree regression based on query search engine results page timestamps.

15. The method of claim 10 wherein the editorial page success metric is a generalized discounted cumulative gain metric.

16. The method of claim 15 wherein the generalized discounted cumulative gain metric is determined as follows,
   for a set of search result pages $\{k\}$
   where wr=rank weight for result at rank r
   wdr=relevance weight for result at rank r
   the generalized cumulative gain metric (GDCG) is a function of wr and wdr wherein the values of wr and wdr are varied such that the function $\Lambda$ is minimized, where $\Lambda = 2k\,(GDCGk-Sk)2$, where k is the kth page view and S is the target page success metric.

17. The method of claim 1 wherein at least one of the plurality of machine learned page success metrics is an automated page success metric.

18. The method of claim 1 wherein at least one of the plurality machine learned page success metrics is a hybrid page success metric.

19. The method of claim 1 wherein the accuracy of each of the plurality of plurality of machine learned page success metrics is determined by calculating an error parameter, sigma, where sigma is defined as $\mathrm{sqrt}(\Lambda N)$, where $\Lambda = \Sigma k\,(PSMk-Sk)2$, where N is the number of page views in the second subset of search engine result pages, k is the kth page view in the second subset of search engine result pages, and S is the target page success metric associated with the kth page view of the in the second subset of search engine result pages.

20. A system comprising:
   a search engine result pages collection module comprising one or more processors programmed to execute software code retrieved from a computer readable storage medium storing software for collecting, over a network, a plurality of search engine result pages;

a target page success metrics determination module comprising one or more processors programmed to execute software code retrieved from a computer readable storage medium storing software for determining a target page success metric for each of the plurality of search engine result pages;

a machine learned page success metrics training comprising one or more processors programmed to execute software code retrieved from a computer readable storage medium storing software for training a plurality of machine learned page success metrics using a first subset of the plurality of search engine result pages and each result page's respective target page success metric, wherein each of the machine learned page success metrics is trained to predict the target page success metric for each of the first subset of the plurality of search engine result pages;

a target page success prediction module comprising one or more processors programmed to execute software code retrieved from a computer readable storage medium storing software for predicting, using each of the plurality of machine learned page success metrics, a predicted target page success metric for each of a second subset of the search engine result pages; and a page success metrics evaluation module comprising one or more processors programmed to execute software code retrieved from a computer readable storage medium storing software for evaluating the accuracy of each of the plurality of plurality of machine learned page success metrics in predicting the target page success metric associated with each of the second subset of search engine result pages.

21. The system of claim 20 wherein each of the search engine result pages collected by the search engine result pages collection module is associated with at least one session variable and the target page success metrics determination module determines target page success metric for each of the search engine result pages using the at least one session variable associated with the respective result page.

22. The system of claim 20 wherein each of the search engine result pages collected by the search engine result pages collection module is associated with at least one editorial variable and the target page success metrics determination module determines target page success metric for each of the search engine result pages using the at least one editorial variable associated with the respective result page.

23. The system of claim 20 wherein each of the search engine result pages collected by the search engine result pages collection module is associated with at least one session variable and at least one editorial variable and the target page success metrics determination module determines the target page success metric for each of the search engine result pages using the at least one session variable and at least one editorial variable associated with the respective result page.

24. The system of claim 20 wherein the first subset of search result pages and the second subset of search result pages are selected such that each page within each subset is a result page produced in response to a navigational query.

25. The system of claim 20 wherein the first subset of search result pages and the second subset of search result pages are selected such that each page within each subset is a result page produced in response to a non-navigational query.

26. The system of claim 20 wherein at least one of the plurality machine learned page success metrics is an editorial page success metric.

27. The system of claim 20 wherein at least one of the plurality of machine learned ranking optimization metrics is an automated page success metric.

28. The system of claim 20 wherein at least one of the plurality of machine learned ranking optimization metrics is an hybrid page success metric.

29. The system of claim 20 wherein the page success metrics evaluation module additionally comprises software code retrieved from a computer readable storage medium storing software for outputting a representation of the accuracy of the of each of the plurality of machine learned page success metrics to a display medium.

30. A non-transitory computer-readable storage medium having computer-executable instructions comprising the steps of:

collecting, over a network, a plurality of search engine result pages;

determining, using at least one computing device, a target page success metric for each of the plurality of search engine result pages;

training, using the at least one computing device, a plurality of machine learned page success metrics using a first subset of the plurality of search engine result pages and each result page's respective target page success metric, wherein each of the machine learned page success metrics is trained to predict the target page success metric for each of the first subset of the plurality of search engine result pages;

predicting, using the at least one computing device, using each of the plurality of machine learned page success metrics, a predicted target page success metric for each of a second subset of the search engine result pages;

evaluating, using the at least one computing device, the accuracy of each of the plurality of machine learned page success metrics in predicting the target page success metric associated with each of the second subset of search engine result pages; and outputting, using the at least one computing device, a representation of the accuracy of each of the plurality of machine learned page success metrics to a display medium.

* * * * *